(Model.) 7 Sheets—Sheet 1.

W. A. LORENZ & L. K. JOHNSON.
TYPE DISTRIBUTING MACHINE.

No. 244,725. Patented July 19, 1881.

*Figure 1.*

Witnesses:
Geo. W. Miatt
Wm. J. Sawyer

Inventors:
William A. Lorenz
Louis K. Johnson
By their Attorney
E. N. Dickerson Jr.

(Model.)　　　　　　　　　　　　　　　　　　　　　　　　　7 Sheets—Sheet 3.
W. A. LORENZ & L. K. JOHNSON.
TYPE DISTRIBUTING MACHINE.

No. 244,725.　　　　　　　　　　　　　　　　Patented July 19, 1881.

Witnesses:
Geo. W. Miatt
Wm. J. Sawyer

Inventors:
William A. Lorenz
Louis K. Johnson
By their attorney
E. N. Dickerson Jr.

(Model.) 7 Sheets—Sheet 4.

W. A. LORENZ & L. K. JOHNSON.
TYPE DISTRIBUTING MACHINE.

No. 244,725. Patented July 19, 1881.

Witnesses:
Geo. H. Miatt
Wm. J. Sawyer

Inventors:
William A. Lorenz
Louis K. Johnson
By their attorney
E N Dickerson Jr (Model.) 7 Sheets—Sheet 5.

W. A. LORENZ & L. K. JOHNSON.
TYPE DISTRIBUTING MACHINE.

No. 244,725. Patented July 19, 1881.

Witnesses:
Geo. H. Miatt
Wm. J. Sawyer.

Inventors:
William A. Lorenz
Louis K. Johnson
By their attorney
E N Dickerson Jr (Model.)

W. A. LORENZ & L. K. JOHNSON.
TYPE DISTRIBUTING MACHINE.

No. 244,725. Patented July 19, 1881.

Witnesses:
Geo. W. Miatt
Wm. J. Sawyer

Inventors:
William A. Lorenz
Louis K. Johnson
By their attorney
E. N. Dickerson Jr.

(Model.) 7 Sheets—Sheet 7.

W. A. LORENZ & L. K. JOHNSON.
TYPE DISTRIBUTING MACHINE.

No. 244,725. Patented July 19, 1881.

Witnesses:
Geo. W. Miatt
Wm. J. Sawyer

Inventors:
William A. Lorenz
Louis K. Johnson
By their Attorney
E N Dickerson Jr

UNITED STATES PATENT OFFICE.

WILLIAM A. LORENZ, OF BROOKLYN, AND LOUIS K. JOHNSON, OF NEW YORK, N. Y.

TYPE-DISTRIBUTING MACHINE.

SPECIFICATION forming part of Letters Patent No. 244,725, dated July 19, 1881.

Application filed May 28, 1881. (Model.)

*To all whom it may concern:*

Be it known that we, WILLIAM A. LORENZ, of the city of Brooklyn, county of Kings, and State of New York, and LOUIS K. JOHNSON, of the city, county, and State of New York, have invented a new and useful Improvement in Type-Distributing Apparatus, of which the following is a full, true, and exact description, reference being had to the accompanying drawings.

Our invention relates to improvements in the type-distributing machines invented by C. W. Dickinson and William A. Lorenz, and heretofore secured by Letters Patent of the United States.

In a printing-establishment pages of type, after they have been used for printing, are bound together by cords and wrapped in paper until they are to be distributed.

Our first improvement has reference to a mode of transferring such pages of type onto the horizontal galley of the distributer, upon which the type stand vertically, and of bringing them within the reach of the operation of the distributing mechanism.

Our second improvement relates to a line-elevating mechanism and a locking contrivance connected therewith.

Our third improvement relates to improvements in the channel through which the type enter the machine, and in the type-driver.

Our fourth improvement relates to the type-carrier and the mechanism for feeling the type.

Our fifth improvement relates to the method of guiding the type which are ejected from the carriers and delivering them into the type-cases beneath.

Our invention is fully shown in the accompanying drawings, of which there are seven sheets, in which similar letters refer to similar parts.

Figure 1:
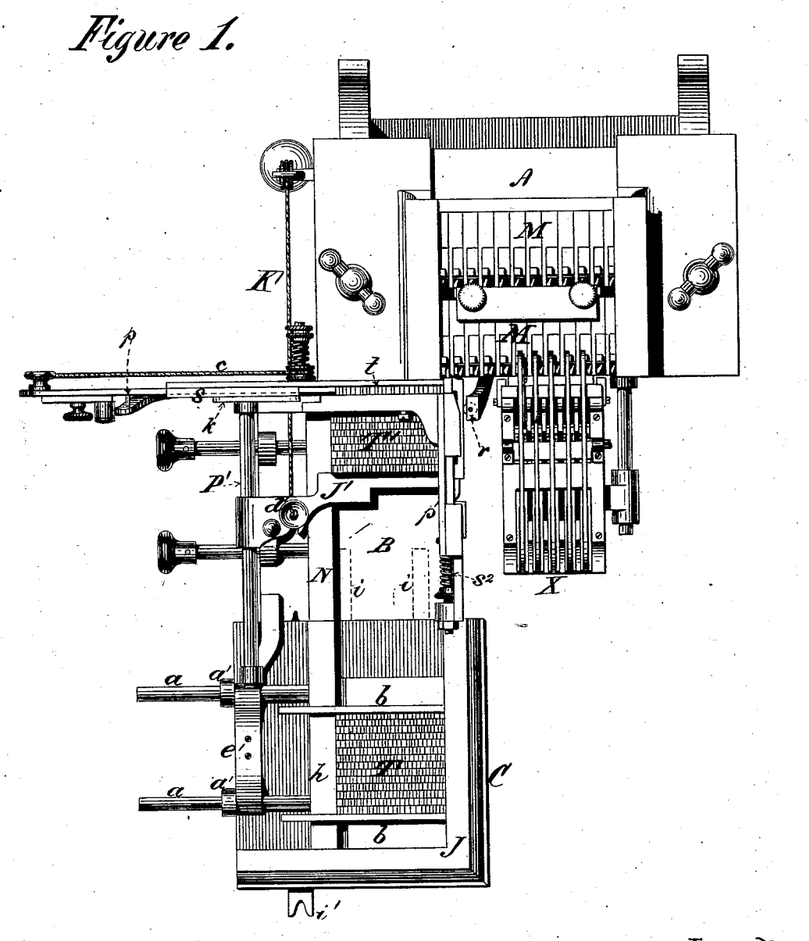
Figure 1 represents a plan view of part of our distributer, showing the transfer-galley in position.
Figure 2:
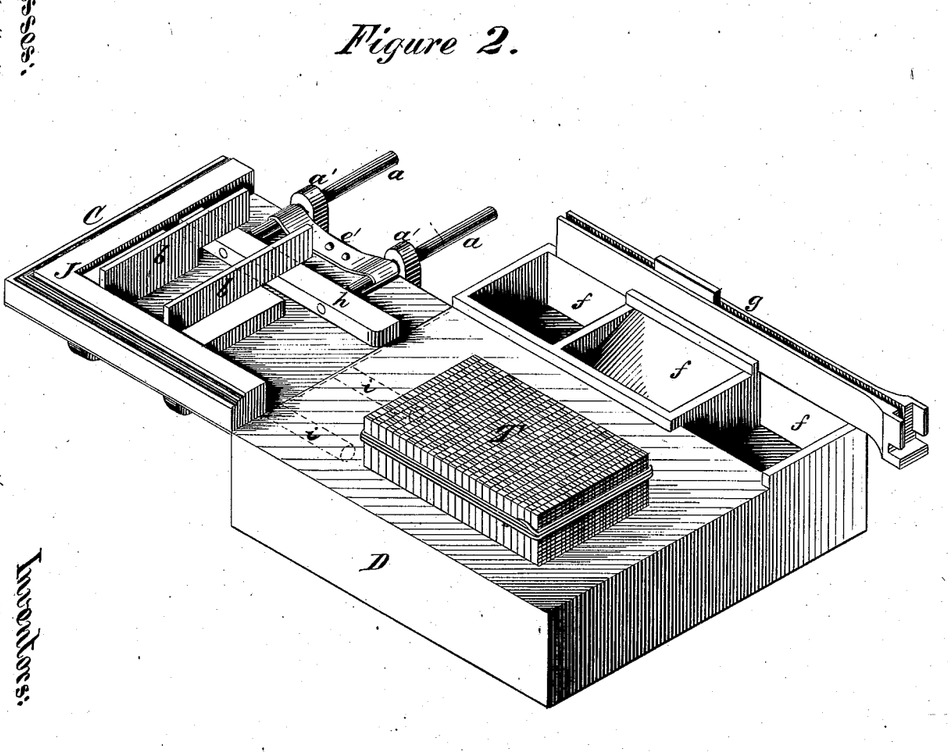
Fig. 2 represents a perspective elevation of the transfer-galley and the page-table.

In Figs. 1 and 2 is represented our improved type-galley and the method of transferring a block or page of type from the page-table to the galley of the distributer. D represents a page-table, upon which the page of type T, bound with a cord, is placed. This table may be provided with the pockets *f*, for the reception of loose matter, and with the transfer-galley *g*, resting in a socket provided in said table. Supported on the pins *i* in holes in the page-table D is the transfer-galley C. The surface of this galley is on the same level as the surface of the table D. This transfer-galley C is provided with the fixed side J and the adjustable side *h*. This adjustable side rail, *h*, is supported and guided on two rods, *a*, sliding through the lugs *a'*. The spring *e'* bears against these rods and creates sufficient friction to hold the side *h* at any point to which it may be adjusted. The transfer-galley is also provided with the two blocks *b b* for supporting the freed type, as presently to be shown. The side *h* is adjusted to the width of the page of type T, which is then on the page-table D. The page of type T is slid upon the transfer-galley C, the support-blocks *b b* placed one at each end and the cord is removed, leaving the page supported on all sides. The transfer-galley C is now removed from the page-table and the rods $i\ i$ are caused to enter corresponding holes in the horizontal galley B of the distributer. The apparatus is so constructed that the level of the type-galley C and of the horizontal bed B is the same. The adjustable side N of the horizontal galley B is then adjusted to correspond with the position of the adjustable side $h$ of the transfer-galley C. The cord K', operating the page-follower J', is then drawn back by the button $d'$ and hooked into the catch $i'$, when the page-follower J' can be thrown over on the rod P' out of the way. Then by holding the blocks $b\ b$ firmly against the ends of the page of type T it can be slid onto the horizontal galley B, when the page-follower J' may be turned back on the rod P' and behind the page T, and the button $d'$, released from the catch $i'$, may be once more attached to the page-follower J', which will then be shoved forward into the position shown at T'. The foremost line of the page T' is then elevated by the vertically-moving line-elevator, arranged to elevate one line of type at a time from the end of the page. This line-elevator is put in operation by means of a line-follower operating a trip-lever. It has been found in practice that said lever is occasionally accidentally operated, thereby elevating a new line of type before the former one has been distributed, and we have devised a contrivance whereby such accidental movement of the trip-lever is prevented. This improvement is fully shown in Figs. 3, 4, and 5.

Figures 3, 4, 5:
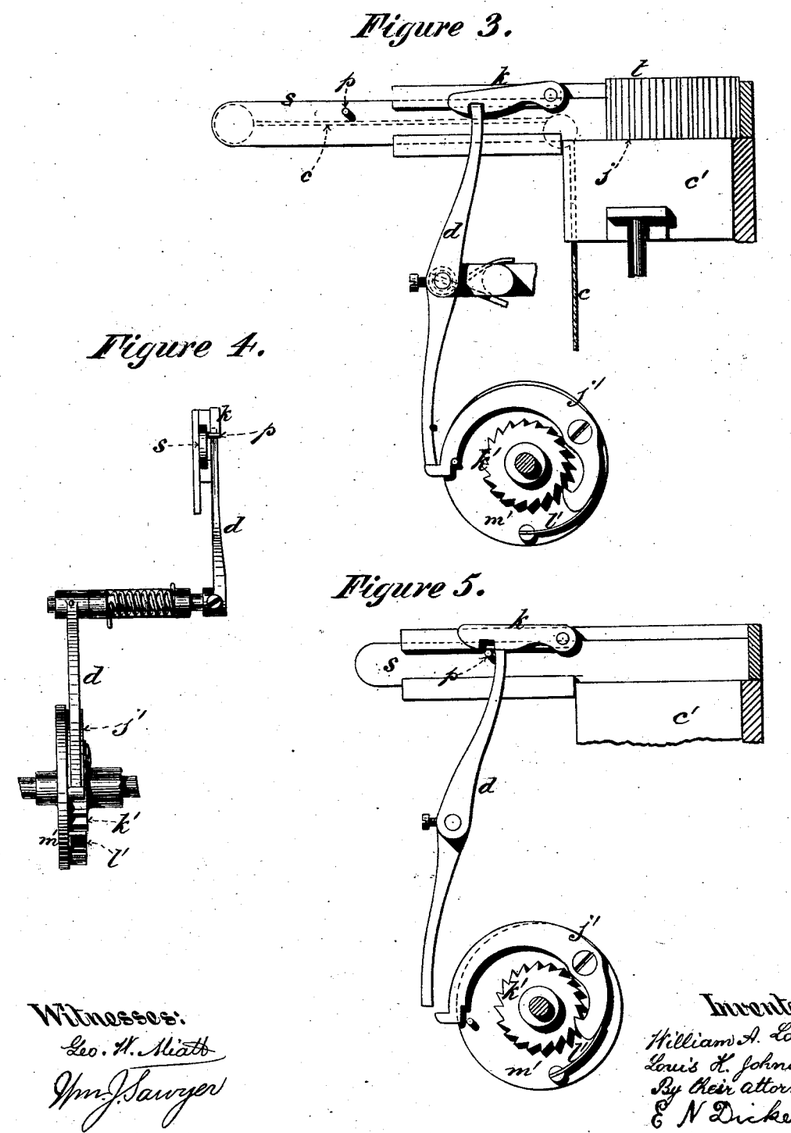
Figs. 3, 4, and 5 represent perspective views of the type-elevating mechanism.

$t$ represents the front line of type which has been elevated by the line-elevator $c'$. This line $t$ is fed into the distributer by the line-follower $s$ operated by the cord and weight $c$.

$d$ represents a trip-lever which engages with the pawl $j'$ and prevents its engagement with the ratchet $k'$ until it is struck by the pin $p$ attached to the line-follower $s$. As the line of type $t$ is exhausted this pin $p$ engages with the upper end of the trip-lever, as shown in Fig. 5, when the lower end of said lever being thrown over off the pawl $j'$, said pawl $j'$ engages with the constantly-revolving ratchet $k'$, whereby the wheel $m'$ is revolved, which wheel operates the line-elevating mechanism $c'$ by means not here shown.

Figures 6, 8:
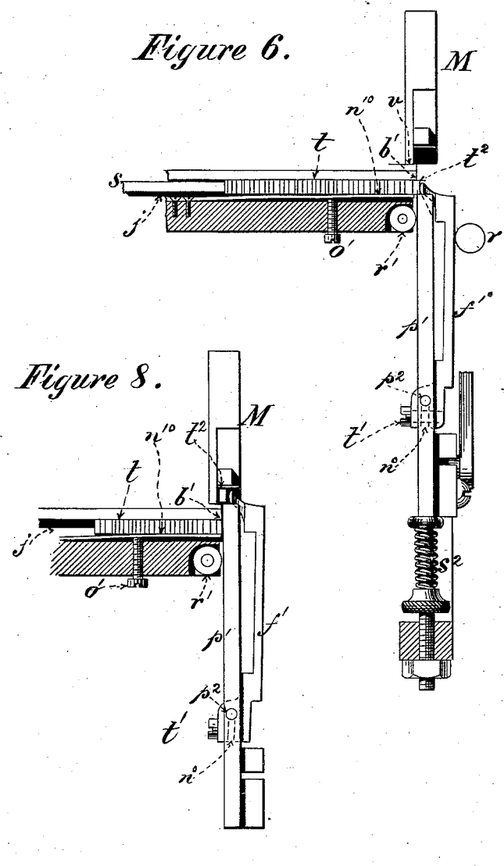
Figs. 6, 7, and 8 represent plan views of the type-driver for feeding the type to the carriers.
Figure 7:
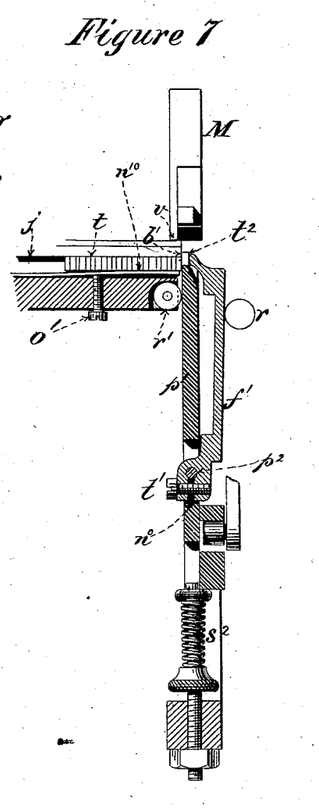
Figure 9:
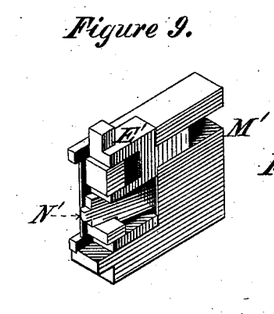
Fig. 9 represents a perspective view of our improved type-carrier.
Figure 10:
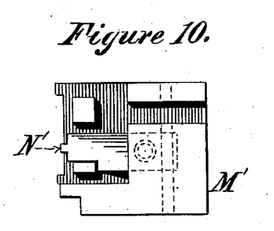
Fig. 10 is a view of the same with the ejector removed, a side elevation of which ejector is shown at Fig. 11, and an end elevation at Fig. 12.
Figures 11, 12:
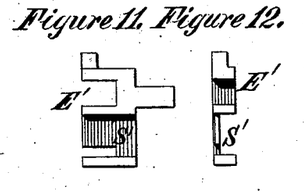
Figure 13:
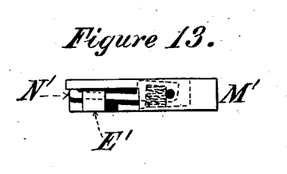
Fig. 13 shows a top view of our improved carrier.

Above the pin $p$ is pivoted the latch $k$, whose hooked end receives and firmly holds the upper end of the trip-lever $d$. The lower side of the latch $k$ is beveled, so that as the pin $p$ advances by the exhaustion of the line of type $t$ it will elevate said latch and free it from the upper end of the trip-lever $d$ before striking said trip-lever. As the pin $p$ recedes after having engaged with the upper end of lever $d$, the latch $k$ drops back and again secures the upper end of lever $d$. By means of this contrivance the before-mentioned difficulty is avoided, and it is impossible to operate the lever $d$ accidentally, since the latch $k$ must first be raised before lever $d$ can be thrown clear of the pawl $j'$. The line of type $t$ advancing along the channel $j$ may be of different widths; therefore we have placed in said channel the adjustable piece $n^{10}$, whereby the width of the throat of this channel is regulated. The position of this piece is fixed by means of the screw $o'$, as is shown in Figs. 6, 7, and 8. These figures also represent our improvement in type-drivers. The type advancing in the channel $j$ are cut off singly from the end of the line by means of what is known as the "type-driver," which driver cuts off the type and holds it firmly until it is delivered into the carrier.

Our improvement has special reference to the mechanism for holding said type during its passage, known as the "type-finger." (Marked $f'$.) The type-driver $p'$ being in the position shown in Fig. 6, the advancing motion of the line of type $t$ in the channel $j$ moves the end type, $t^2$, free of the corner $b'$, when the cut-off spring $s^2$ operates the type-driver $p'$, and drives the type $t^2$ forward into the position shown in Fig. 7. There it is held between the side $b'$ of the channel $j$, the type-driver $p'$, and the type-finger $f'$. This type-finger $f'$ has heretofore been held against such type by means of a spring; but we use friction instead of a spring to accomplish this result. The type-finger $f'$ has a slot cut in its end at $n^o$. Through the end of this slot there passes the pin $p^2$. The screw $t'$ cramps the jaws of the finger $f'$ upon the pin $p^2$, regulating the amount of friction. The type-driver continuing its forward movement comes into the position shown in Fig. 8, when the type drops into the carrier M; but the finger $f'$ does not follow it sidewise into the recess of the carrier, because it is held by the friction on the pin $p^2$. The side of the recess $v$ of the carrier M is set behind the end $b'$ of the channel $j$, when said carrier M is in position to receive the type. Wherefore the type $t^2$, coming into the recess between the type-driver $p'$, the finger $f'$, the channel end $b'$, and the carrier, is allowed to drop until its foot rests against the bottom of the carrier, which was not the case in the former machine, because the type-finger $f'$ followed the type with a continued pressure into the recess and prevented its dropping, so that a cap had to be used to keep down the type, which cap was inoperative upon spaces and quadrats, and was liable to batter the type. By means of this contrivance all type have their bases brought to the same level by means of gravity, in whatever position they may leave the type-driver. It is necessary that the position of rest of the carrier M should not be such as to allow sufficient space for the type $t^2$ to turn between the finger $f'$ and the side of the recess $v$. The type-driver $p'$ rests against the roller $r'$, as shown in the drawings, and the position of the finger $f'$ is determined by means of the reciprocating roller $r$. By means of the roller $r$ the finger $f'$ is moved up against the line of type at each return movement of the type-driver $p'$.

In Figs. 9, 10, 11, 12, and 13 is shown our improvement in type-carriers. M' represents the carrier-body, which is provided with the clutch N' and ejector E². This ejector E' slides under the clutch N' in the cored-out portion of M', as is clearly shown in the drawings. This ejector is provided with three ejecting-arms. Between the two lower arms we have added a web or stripper, S', by means of which any short type or broken piece of type is removed from the carrier when the ejector is thrown forward.

Figure 14:
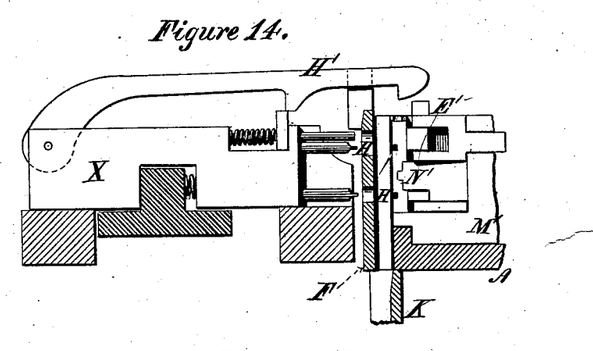
Fig. 14 represents our improved type-ejecting mechanism, showing the grooved plate for the reception of the ejected type.
Figure 15:
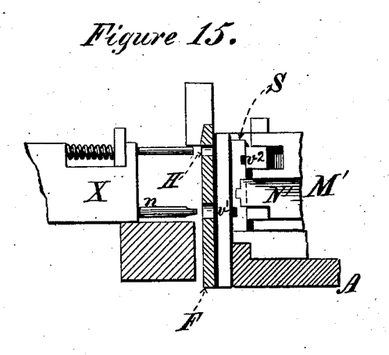
Figs. 15 and 16 represent improvements in apparatus for selecting spaces.
Figure 16:
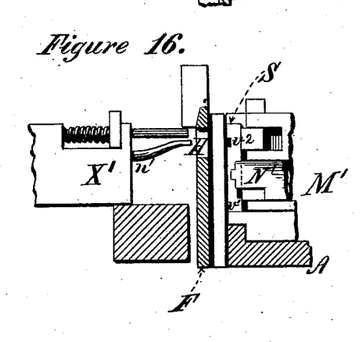

Figs. 14, 15, 16, 17, and 18 represent improvements in the feeler mechanism of the apparatus, by means of which the type are automatically selected. Fig. 14 is a lateral elevation, showing clearly the conductor-plate F pierced with the holes H for the passage of the feeler nick-pins and the rest-block pins. Figs. 15 and 16 represent, generally, a contrivance by means of which quadrats or spaces are automatically selected by this machine and deposited in their cases, no matter in what position they may be held in the carrier. It is obvious that the spaces or quadrats may be used in printing with either end up, and that they may be arranged with either side toward the bottom of the page, so that it may happen that, when these spaces are delivered to the distributer, they may be delivered in any one of four positions, with either end up, and with either edge out. Therefore some peculiar device has to be employed to select automatically these spaces, no matter in what position they may be left in the carriers. S represents such a space held in the carrier M' by means of the clutch N'. This space is provided with two nicks, $v'$ and $v^2$, one in the front and one in the back. It is obvious that in whatever position the space may rest in the carrier M' there will be always a nick presented to the feelers, either at the bottom, as shown in Fig. 15 at $v'$, or at the top, as shown in Fig. 16 at $v^2$. Two feeler-slides, X X', are provided with corresponding nick-pins, $n$ and $n'$, $n$ being arranged to enter the nick $v'$ at the bottom, $n'$ being arranged to enter the nick $v^2$ at the top, and, of course, when either of the pins $n$ $n'$ enters the nicks in the space the corresponding hook will drop and the space be ejected, and therefore no space provided with nicks $v'$ and $v^2$ can pass both these feeler-slides.

Figure 17:
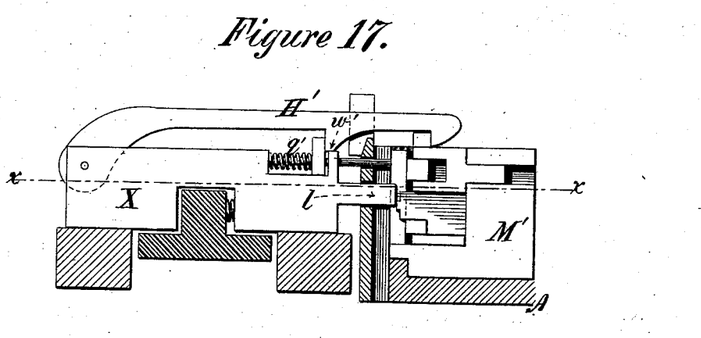
Fig. 17 represents an apparatus by means of which type remaining in the carriers are selected by means of their thickness. The upper half of Fig. 18 represents a section through Fig. 17 on the line $x$ $x$. The lower half represents a similar section through the next type-selecting mechanism.
Figure 18:
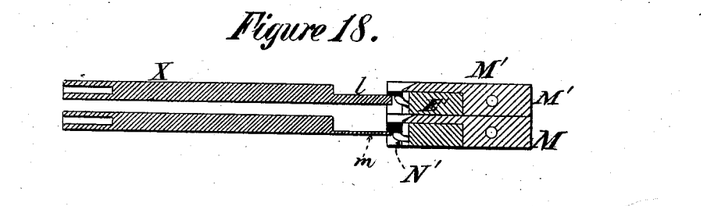

Figs. 17 and 18 represent an improvement by means of which type not nicked for the machine, or which may from any other cause have passed preceding hooks, are delivered in order in channels instead of being dropped into indiscriminate "pi." As no conductor could guide through one channel type of greatly varying thicknesses, such type have heretofore been dropped into a receptacle by means of the last hook, which drops at every beat of the machine, and throws out every character left in the carriers by the preceding hooks. In this improvement two or more feeler-slides are arranged at the end of the series, in all respects like the others, except that the dropping of their hooks depends upon the thickness of the type felt instead of upon the nicks. A finger, $l$, is connected with the feeler-slide X, and is so arranged with reference to the type or characters held in the carrier M' that it will pass alongside of a narrow type, but will bring up against the edge of those which are above a certain thickness. The hook H', of course, only drops when the finger $l$ passes the type; and the conductor-channel through which the type drops from the first feeler is arranged with reference to the thickness of the type to pass throught it, so that the type cannot turn in their passage through such conductor. The next feeler is similarly constructed, except that its test-finger $m$ will pass by a thicker type than the test-finger $l$, so that type of the next thickness are selected by it and dropped into their proper channel. The last hook drops at every beat of the machine, as described in the previous patents.

Figure 19:
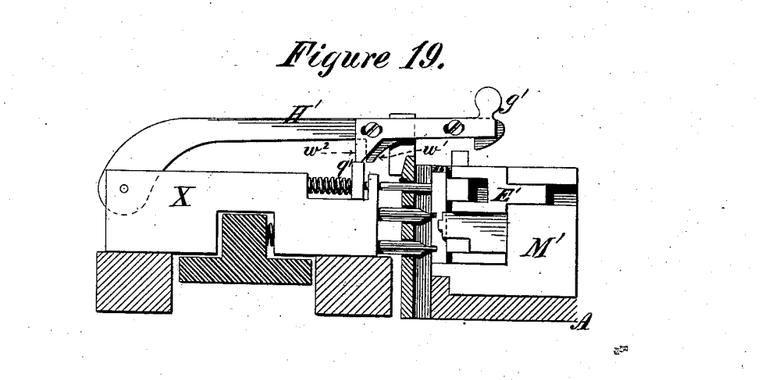
Fig. 19 represents a contrivance by means of which any hook can be thrown out of operation, whereby the type which would otherwise be ejected by it are retained in the carriers.
Figure 20:
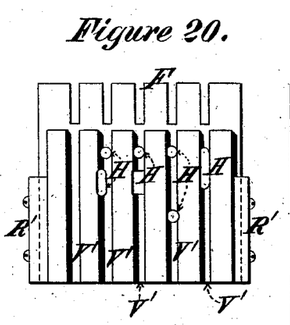
Figs. 20, 21, 22, 23, 24, and 25 represent views of our improved type-guiding apparatus.

Fig. 19 represents an improvement by means of which the withdrawing-hook can be prevented from dropping except at the pleasure of the operator. This improvement is especially useful by allowing two adjacent feeler-slides to be arranged for the withdrawal of the same letter—as, for instance, the letter e—which most frequently occurs. If there were only one slide for the selection of this letter, its corresponding channel in the receiving-case below would be filled more rapidly than the others, thereby necessitating the substitution of a new case. By means of this contrivance the first hook in the series is allowed to select the e character until its corresponding channel in the case below is filled, when it is prevented from operating further, and the second hook is allowed to eject the same character into a new channel in the case below. This result we accomplish practically in the manner shown in Fig. 19. The hook H' rests upon the permanent bearing-surface $w'$, shown also in Fig. 19. Attached to the said hook H' is the sliding piece $g'$, slotted and supported on pins or screws, as is shown. When this is slid toward the vibrating point of the hook H', as is shown in Fig. 19, the bearing-surface $w'$ is continued by the bearing-surface $w^2$, so as to lengthen the same. Then it is obvious that the hook H' cannot drop, notwithstanding the rest-block $q'$ is thrown back to a distance equal to the depth of the nicks in the type, as is shown in Fig. 19, since the hook H' is still supported on the rest-block $q'$ by means of the sliding bearing-surface $w^2$.

Figure 21:
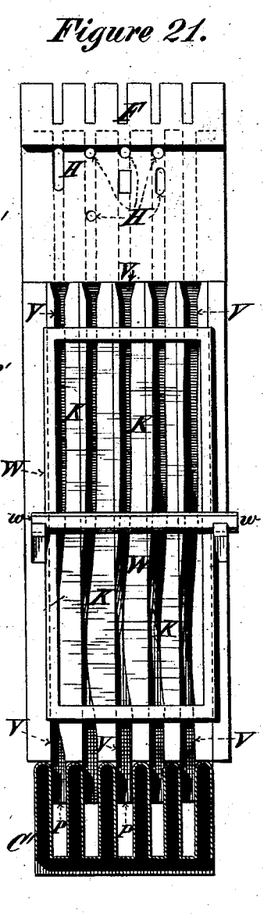
Figure 22:
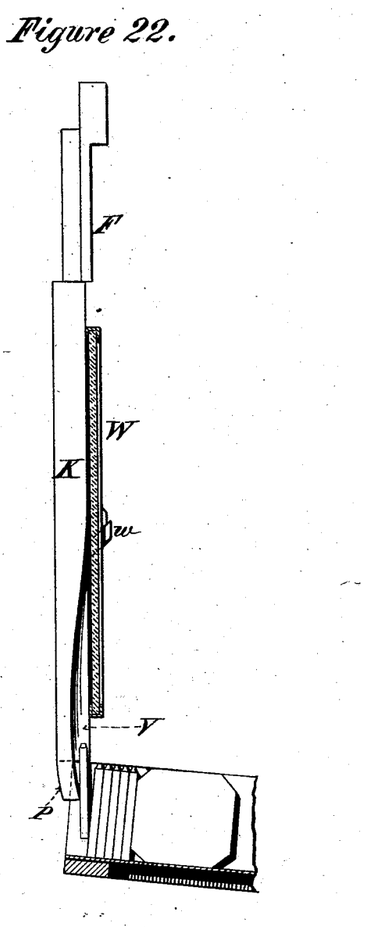
Figure 23:
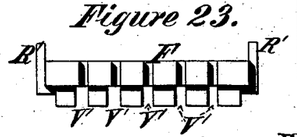
Figure 24:
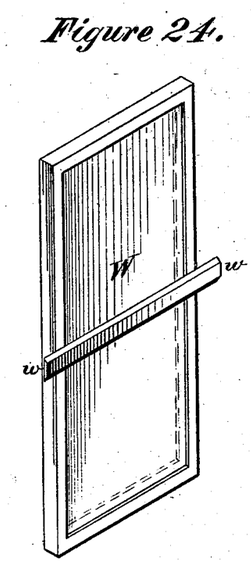
Figure 25:
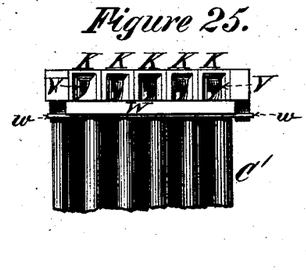

Figs. 20, 21, 22, 23, 24, and 25 represent improvements in the apparatus for conducting the type from the carrier to the case below. F represents our improved conductor-plate now made removable. The type ejected from the carriers are guided downward through channels V' cut in the face of the conductor-plate F nearest the carriers. This plate F is slotted at its upper end to receive and guide the hooks, and is pierced with holes H to allow the passage of the feeler nick-pins and the rest-block pins. This conductor is supported in the guides R', and is thereby made removable. Below the conductor-plate F are the conducting-channels V, which are formed by separate bars K, and form a lower conductor-plate provided with channels for the reception and guidance of the type, corresponding to the channel V' of the conductor-plate F. These channels are clearly shown in Fig. 21. The conductors K are formed of square bars of metal in which are cut grooves which have a longitudinal twist of ninety degrees, so that the type reaches the bottom of each conductor turned a quarter of a turn. This curved groove is commenced about the center of each bar at the top, and comes out at the bottom nearly or quite at the side of the bar, depending on the thickness of the particular groove. The conductors K are arranged side by side, any open groove near the bottom of one being closed by the solid side of the next, thus making each groove complete on three sides, the front of the grooves being closed by a glass window, W, supported on the lugs $w$, as shown in Figs. 21 and 24. This removable glass window prevents the type from falling out of the grooves; through it the passage of the type down the conductors can be observed, and on its removal any wedged type or other obstruction can be easily taken out. The lower ends of the conductors K are bent, as at P, so that the descending type striking against this bend or curve have their momentum arrested, and are prevented from being bruised by falling directly on the bottom of the case.

We do not claim the folded case C' here shown as of our joint invention; but

What we do claim, and desire to secure by Letters Patent, is—

1. A transfer-galley provided with two or more rods which are constructed to enter corresponding holes in the transfer-table, and the horizontal galley of a distributing-machine, substantially as and for the purposes described.

2. The combination, in a type-distributer in which a line of type is fed continuously into the machine and by it distributed, and in which a new line is substituted on the exhaustion of the former one, of a locking contrivance or latch, and the line-follower carrying a tripping device by which the operation of the line-elevating mechanism is prevented except after the exhaustion of the line, substantially as described.

3. In a type-distributing machine in which a line of type is fed into the machine by means of a cut-off mechanism, a finger connected with the cut-off mechanism, which supports the type in its passage from the line into the machine and is held against said type by friction, substantially as described.

4. In a type-distributing machine in which a line of type is fed into the machine by means of a cut-off mechanism, a type-holding finger connected with the cut-off mechanism, which supports the type in its passage from the line into the type-carrier and is held against said type by an adjustable friction-clutch, substantially as described.

5. The combination, in a type-distributing machine, of a transfer mechanism which seizes and transfers a type from an advancing line, and a carrier, constructed substantially as described, whereby the type is placed in the carrier and allowed to drop by gravity before it is seized by the type-holding device of the carrier.

6. A type-carrier provided with an ejector for the purpose of ejecting type from said carrier, which ejector is provided with one or more ejecting-arms and a web or stripper connected with said arm or arms, whereby the type, whether broken or intact, is certainly ejected from the carrier, substantially as described.

7. A type or character provided with corresponding nicks on its opposite edges, cut at equal distances from its ends, whereby it is selected by the selecting mechanism, whichever edge is presented to such mechanism, substantially as described.

8. In a type-distributing mechanism, the combination of a type-feeler and type, constructed substantially as described, whereby said feelers will operate to eject the type or character, independent of the position of such type in the carrier.

9. In a type-distributing machine in which type are selected by a nick-pin entering a nick in the type, two selecting mechanisms provided with such selecting nick-pins placed at equal distances above and below the central line of the type or character, whereby the said character is selected irrespective of the end which is up in the carrier, substantially as described.

10. In a type-distributing mechanism in which type are selected by means of feeler nick-pins, the combination of two feeler nick-pins situated at equal distances from the central line of the type, and connected each with its own ejecting mechanism, with a type having corresponding nicks situated at equal distances from its central line on its two edges, whereby said type or character is selected, in whatever position it is presented to the feeling mechanism, substantially as described.

11. In a type-distributing machine in which the type are ejected from carriers by ejecting or withdrawing mechanism, an apparatus, constructed substantially as described, whereby one or more of the ejecting mechanisms can be prevented from ejecting its corresponding type.

12. In a type-distributing machine in which the type are ejected from the carriers by means of hooks supported on movable blocks, the combination of the hook, movable block, and the means, substantially as described, of increasing or lengthening the bearing-surface of said hooks, whereby they can be prevented from dropping at the will of the operator.

13. A type-selecting mechanism which consists of an advancing and retiring feeler-slide provided with a test-finger which passes by type below a certain thickness, and by its passage causes the ejection of such type or character, but does not eject from the carrier type of a greater thickness, substantially as described.

14. In a type-distributing machine in which type are ejected from carriers and allowed to drop into cases beneath, a type-conducting plate which receives and guides the falling type, and is supported in slides or equivalent mechanism and is thereby made removable from the machine, substantially as described.

15. In a type-distributing machine in which type are ejected from carriers and allowed to drop into cases beneath, a series of conducting-channels for the purpose of receiving and conducting such type to the cases below, which consists of bars having in them a groove or channel cut through from the surface of said bars, which channel is cut so as to have a twist or turn, whereby the descending type are by their descent twisted or turned so as to have a different position on their delivery from that in which they were delivered to the conductor.

16. A type-conducting channel cut from the surface in a bar, which channel is closed on the one side by the next conducting-bar and in front by a removable plate, substantially as described.

17. In a type-distributing machine, a series of twisted conducting-channels, which channels are closed on one side by means of a removable glass plate, substantially as described.

18. In a type-distributing machine, a series of conducting-grooves for receiving and conducting the type from the carriers to the cases beneath, which conductors are bent or curved for the purpose of impeding the descent of the type, and thereby preventing the bruising of the type, substantially as described.

19. In a type-distributing machine in which a line of type is fed continuously into the machine, an adjustable channel provided with mechanism for holding the end type firmly in said channel at its throat until it is removed therefrom by the cut-off mechanism, substantially as described.

WILLIAM A. LORENZ.
LOUIS K. JOHNSON.

Witnesses:
GEO. H. EVANS,
T. H. HARRAH.